United States Patent
Klausnitzer et al.

(10) Patent No.: US 8,715,820 B2
(45) Date of Patent: May 6, 2014

(54) ODOUR-ABSORBING SHEET-LIKE STRUCTURE, METHOD FOR ITS PRODUCTION AND USE OF ZINC RICINOLEATE IN FINELY DIVIDED SOLID FORM ON ODOUR-ABSORBING SHEET-LIKE STRUCTURES

(75) Inventors: Bernd Klausnitzer, Bruckmühl (DE); Albrecht Klimmek, Bruckmühl (DE); Ernst Raabe, Raubling (DE)

(73) Assignee: Neenah Gessner GmbH, Bruckmühl (DE)

( * ) Notice: Subject to any disclaimer, the term of this patent is extended or adjusted under 35 U.S.C. 154(b) by 1386 days.

(21) Appl. No.: 12/021,058

(22) Filed: Jan. 28, 2008

(65) Prior Publication Data

US 2008/0226886 A1    Sep. 18, 2008

(30) Foreign Application Priority Data

Mar. 16, 2007    (DE) .......................... 10 2007 012 743

(51) Int. Cl.
  B32B 9/00   (2006.01)
  B32B 9/02   (2006.01)
  C07F 3/06   (2006.01)
  B01D 37/02  (2006.01)
  B01D 39/16  (2006.01)

(52) U.S. Cl.
  USPC ............. 428/328; 428/220; 428/340; 55/524; 55/527; 55/528

(58) Field of Classification Search
  USPC ............. 428/212–213, 219–220, 292.1, 323, 428/330, 332, 334–336, 340–341; 442/59–180; 55/522–528, DIG. 2
  See application file for complete search history.

(56) References Cited

U.S. PATENT DOCUMENTS 6,203,810 B1 *    3/2001   Alemany et al. ............... 424/404
2003/0026914 A1 *  2/2003   Green et al. ............... 427/407.1

FOREIGN PATENT DOCUMENTS

| DE | 3726626 A1 | 2/1988 |
| DE | 3808114 A1 | 9/1989 |
| DE | 4204553 A1 | 8/1993 |
| DE | 4240172 C2 | 6/1994 |
| DE | 19513658 A1 | 10/1995 |
| DE | 19531343 A1 | 3/1996 |
| DE | 196 15 209 C1 | 12/1997 |
| DE | 19615209 C1 | 12/1997 |
| EP | 1199094 A1 | 4/2002 |
| EP | 1319394 A1 | 6/2003 |
| EP | 1250938 A3 | 10/2003 |
| EP | 1674014 A1 | 6/2006 |
| WO | WO 00/40134 | 7/2000 |
| WO | WO 2008/058564 A | 5/2008 |

OTHER PUBLICATIONS

Sarah G. Schulz et al.: "Interaction of surfactants and nanostructured surfaces", Database CA, Chemical Abstracts Service, Columbus, Ohio, US Database Accession No. 2005:392537.

* cited by examiner

*Primary Examiner* — Prashant J Khatri
(74) *Attorney, Agent, or Firm* — Henry M. Feiereisen LLC; Ursula B. Day

(57) ABSTRACT

Odor-absorbing sheet-like structure comprising vegetable and/or manmade fibers, in particular a sheet-like structure having an air permeability suitable for filters and vacuum cleaner bags, which sheet-like structure has zinc ricinoleate in an amount in the range of 0.1 to 20% by weight, based on the weight of the sheet-like structure, in finely divided solid form on at least a part of the free fiber surface, and method for its production by treatment of a sheet-like structure with a dispersion of fine zinc ricinoleate particles or by spraying on a mist of a melt or solution of zinc ricinoleate.

7 Claims, No Drawings

ODOUR-ABSORBING SHEET-LIKE STRUCTURE, METHOD FOR ITS PRODUCTION AND USE OF ZINC RICINOLEATE IN FINELY DIVIDED SOLID FORM ON ODOUR-ABSORBING SHEET-LIKE STRUCTURES

CROSS-REFERENCES TO RELATED APPLICATIONS

This application claims the priority of German Patent Application, Serial No. 10 2007 012 743.1, filed Mar. 16, 2007, pursuant to 35 U.S.C. 119(a)-(d), the disclosure of which is incorporated herein by reference.

BACKGROUND OF THE INVENTION

The present invention relates to the area of the improvement of air quality, in particular the improvement of respiratory air in living rooms and workrooms by the use of absorber materials which are capable of reducing the contamination of the air by undesired odorants. In particular, the invention relates to sheet-like absorber materials having an air permeability which is suitable for the intended use, can be arranged on or in spatially limited, localized sources of undesired odours and ensure that the odours developed by these sources are bound and do not enter the respiratory air. In particular, the sheet-like absorber materials are intended for use in or on commodity articles or apparatuses, in particular technical apparatuses, for the household or other daily needs.

A field of use of the present invention which is to be singled out in particular is use in the interior of vacuum cleaners, where the dust which has already been sucked into the vacuum cleaner filter and continues to collect there over the time during which no change of filter is required constitutes a source of undesired odours. In the present Application, the purpose and the mode of action of the absorber materials according to the invention are therefore explained primarily for the example of a vacuum cleaner, but further potential uses for the absorber materials according to the invention, for example in the household, in the motor vehicle sector and other related areas, including healthcare, are evident to the person skilled in the art from these explanations and the following more briefly discussed further examples.

During vacuum cleaning, numerous constituents, for example crumbs and fragments of food constituents, particles from animal keeping, tobacco smoke, general house dust and microorganisms occurring in the environment to be cleaned, enter the vacuum cleaner filter bag together with the dust sucked in and either release odorants ("smell") by their very nature or gradually decompose in the vacuum cleaner filter bag or rot there and as a result of such processes begin to produce an unpleasant smell. As long as the vacuum cleaner is not used, these odours remain substantially in the interior of the vacuum cleaner and generally do not greatly contaminate the room air. However, if the vacuum cleaner is put into operation again, these odours, together with their carrier atmosphere, are displaced from the filter bag by the external air sucked in and are blown out of the vacuum cleaner. It is for this reason that, when the vacuum cleaner is put into operation again, the result is frequently the release of a cloud of unpleasant odour, which is felt by many to be annoying and, for example, may make it necessary to thoroughly ventilate the freshly vacuumed premises after vacuum cleaning.

In view of this unpleasant phenomenon, there have already been various proposals to prevent or at least to reduce the odour development described by preventing the odorants from being blown out of the vacuum cleaner, so that they do not enter the room air. Thus, for example, DE 195 13 658 A1 proposes arranging, in a vacuum cleaner, behind the dust filter and before the turbine which blows the air sucked in by it through the filter out of the vacuum cleaner, a particular odour filter which is designed as an air-permeable support having an abrasion-resistant form of active carbon bound to the support. In this proposal, however, the odour filter comes into contact with the air to be purified only when the latter is sucked as an air stream through the filter. When the vacuum cleaner is switched on, the filter is therefore abruptly flooded by an odour cloud from the filter interior, which cloud has passed through the filter within a short time, and it has proved to be difficult to achieve satisfactory removal of odour from the moving air stream in the relatively short contact time.

According to DE 196 15 209 C1 and further documents discussed in the introduction of DE 196 15 209 C1, it was therefore also proposed not to remove the odours from a vacuum cleaner bag from the flowing exhaust air during operation of the vacuum cleaner but to ensure that they are bound by an absorber material from a static atmosphere when the vacuum cleaner is not in operation. For this purpose, however, the absorber material intended in each case must be in direct contact with the atmosphere in the interior of the dust filter even when the vacuum cleaner is not switched on, so that it can prevent this atmosphere from becoming saturated with the undesired odours at all. The proposed absorber material is a filter paper which is impregnated at least on one side with solid adsorber particles and which is used in combination with a particle filter. Materials based on active carbon and natural or synthetic zeolites are mentioned as adsorber particles. In the case of the proposal according to DE 196 15 209 C1, however, discharge of the adsorber particles from the treated layer and hence blockage of the following particle filtration layer may occur owing to mechanical loads, which results in decreasing air permeability of the filter and hence a reduced duration of use. Furthermore, a discharge of the adsorber particles from the bag can never be completely prevented, resulting in contamination of the air actually to be freed from particles. Moreover, the adsorption capacity in the filter bag is gradually further reduced by the adsorber loss.

A related reference is mentioned below for the sake of completeness and is concerned with effectively eliminating odours of sucked-in dirt before the air is blown out in the region of the dust filter bag. Thus, it was also proposed to place active carbon in additional specially produced filter cassettes in the air stream of the vacuum cleaner (cf. DE 42 40 172, DE 42 04 553), with the disadvantages that the suction power suffers through these additional assemblies and odour adsorption takes place only during the operation of the vacuum cleaner owing to the spatial separation of odour source and odour adsorber.

WO 00/40134 proposes arranging the adsorber loosely or in a three-dimensional framework structure (e.g. foam) in a layer of a multilayer filtration medium. In particular, the poor handling during the production of the medium should be mentioned as disadvantageous here (dust generation, trickling, non-uniform distribution due to shaking, the presence of a separation layer or on connection of layers by welding or adhesive bonding).

DE 195 31 343 describes a method in which the odour-adsorbing element is arranged spatially separately from, but in the immediate vicinity of, the dust bag. Here, the inconvenient handling during changing of filter elements should be noted since the capacities of two separate components may be exhausted at different times. Thus, constant checking of the operability is expedient. Functioning is guaranteed only with active flow through the element when the vacuum cleaner is switched on, whereas the adsorption is prevented in rest phases owing to the spatial separation.

In addition to active carbon particles, particulate zeolites are also employed for uses of the type mentioned. Thus, for example, EP 1 674 014 A1 proposes the use of, in particular, zeolite particles in immobilized form on that layer of a multilayer filter which is outermost on the outflow side. However, a disadvantage of the use of zeolites is in general their high selectivity and hence limited binding capability for various constituents of an odour, which as a rule is a complex mixture of different odorants, and the reversibility of the odour adsorption, together with the abrasive effect of the zeolite particles in the production process and during later processing steps.

With the use of particulate adsorbers, the immobilization of these substances is generally problematic since fixing of the particles on a support material, for example by an adhesive, can lead to loss of the adsorption capacity since there is the danger of sealing the surface of the particles.

The adsorber materials (active carbon, zeolites) discussed so far belong to a type of materials which, owing to a large adsorptive free surface area, substantially adsorptively bind odorants to be removed from the gas space, for example to their internal surface, for example in the zeolite crystal lattice, or in their pores (mesopores or micropores, for example of active carbon). The so-called cyclodextrins constitute a further class of substances having a comparable principle of action.

However, materials of said type, particularly when they are used alone, have a number of shortcomings which make them appear a suboptimal choice:

Active carbon is preferred for applications in which a broad action spectrum, high capacities and good kinetics are important. A disadvantage is a certain reversibility of the adsorptive binding which manifests itself, for example, as a tendency to result in desorption of the previously adsorbed odorants on high saturation of capacity, and a tendency that competitive displacement of adsorbed molecules by others which have a higher affinity for the surface of the active carbon is observable. In particular, aromatic hydrocarbons (benzene, toluene, xylene, abbreviated to BTX) compete with other molecules for free surfaces on the active carbon. Owing to their brittleness and black colour, moreover, their use is limited to areas where mechanical tolerance and surface appearance are not important.

Depending on the exact crystal structure in each case, the class consisting of the zeolites has a high adsorption specificity. Depending on the ratio of silicon to aluminium in the crystal structure, more or less pronounced hydrophilic properties are obtained in the cavities of the crystal lattice. As a result of the pronounced selectivity with respect to the polarity of the guest molecule, there is a high probability of competitive displacement from the host lattice. Zeolites are as a rule colourless but, being hard granular particles, are not suitable for all application forms.

Cyclodextrins, owing to their molecular form, in which the hydrophilic OH groups of the sugar base units point outwards and a hydrophobic region forms in the cavity, have a narrower action spectrum especially for lipophilic molecules and slower adsorption kinetics. In addition, with them as with active carbon or the zeolites, desorption occurs due to competitive displacement or elution.

What has been explained in the present Application so far with reference to the conditions in a vacuum cleaner also applies more or less to other areas of daily life where undesired odours develop. Thus, undesired odours or odour-saturated static gas spaces (odour-saturated stationary atmospheres) are also present elsewhere, for example in other more or less closed waste containers, e.g. dustbins, containers with medical waste, containers with food residues and the like, shoes, from which they can suddenly emerge and enter the room air on opening of the containers. Odour-laden relatively closed atmospheres also develop in narrow confines having a high density of occupation by persons and/or animals, for example, in the interior of vehicles, in transport rooms, and may also be present, for example, inside technical apparatuses, for example those with air cooling. Odour absorption from odour-laden closed atmospheres, without substantial air exchange with the surrounding atmosphere is to be regarded as "static" even when such an atmosphere is circulated to intensify contact with the absorber. An odour-laden microclimate in which odours propagate and concentrate can also form in the vicinity of odour extractors or extractor hoods for kitchen odours. Unless, in the respective individual case, the person skilled in the art is prevented from applying the teaching of the present invention for particular, case-specific reasons, this teaching can also be applied to other fields of use of this type, i.e. outside the narrow range of air improvement in vacuum cleaning, without their being any need to expressly list all possible individual cases herein.

It is evident from the abovementioned description of the prior art that there is still a need for an effective reduction of the contamination of respiratory air or room air by undesired odours from various apparatuses and articles of the household or of daily needs, for which a vacuum cleaner is an important example.

SUMMARY OF THE INVENTION

An object of the present invention can therefore be designated as developing, for applications of the type described above, novel improved odour absorbers which are sheet-like structures of the paper or nonwoven type or textile sheet-like structures having the air permeability and strength required for the specific application and which use or at least concomitantly use, for odour elimination, materials which ensure practically irreversible binding of odorants under the respective conditions of use.

A further object of the present invention may be designated as developing methods suitable in practice for the production of those odour absorbers which take into account the peculiarities of handling of the selected absorber material.

A further object and advantages of the present invention are evident to the person skilled in the art from the following general explanations and from the use examples, which disclose currently preferred embodiments of the invention but are purely by way of example and which are not intended to limit the invention.

These and other objects are achieved by an odour-absorbing sheet-like structure comprising at least one of vegetable and manmade fibres, and zinc ricinoleate in an amount in a range of 0.1 to 20% by weight, based on the weight of the sheet-like structure, in finely divided solid form on at least a part of the free fibre surface; and a method for the production of such an odour-absorbing sheet-like structure comprising vegetable and/or manmade fibres by providing a dilute dispersion which contains finely divided particles of zinc ricinoleate; applying the dispersion which contains finely divided particles of zinc ricinoleate to the surface of the sheet-like structure on at least one side so that the fibre surface is at least partly impregnated with zinc ricinoleate; and heating and drying of the sheet-like structure treated with the dispersion.

Further features which distinguish the invention and contribute to the achievement of the above objects are evident to the person skilled in the art from the following description and the discussions to be found therein on the features of product and method and the advantages of different embodiments described and examples of the invention.

The present invention is based on the fact that, for the purposes of the type described in the introduction to the description, an odour absorber type known per se but usually used for other intended uses is used, with which odour absorber type odours are bound practically irreversibly by a process which can be described as chemisorption, and that the practical technical difficulties associated with the use of such an odour absorber material type in the production of air-permeable sheet-like structures, in particular of the paper and/or nonwoven type, could be overcome.

The odour absorber material discussed belongs to the class consisting of the metal soaps, i.e. to the metal salts of relatively long-chain fatty acids, and the preferred compound from the class consisting of these materials is the compound zinc ricinoleate.

Zinc ricinoleate was described for the first time in the patent applications DE 37 26 626 A1 and DE 38 08 114 A1 as a substance having a particular odour-absorbing effect. Numerous specific or more general hypothetical potential uses in which this odour absorption is utilized have since been proposed for this compound. Thus, for example in the documents EP 1 250 938 A1 or EP 1 319 394 A1, a solution containing a certain formulation of zinc ricinoleate and intended for use in deodorants is protected. A use, for example, as an odour-improving additive to detergents and as impregnating constituent for eliminating perspiration odour in clothing textiles has also already been proposed. The observed effect of zinc ricinoleate is investigated and explained mechanistically in more detail in various scientific publications, for example, inter alia, in the publications by Boehmer, Mueller, Peggau, Tenside Surf Det. 41 (2004), 6, pages 283-286; Kuhn, Müller, Peggau, Zekorn, J. of Surfactants and Detergents, vol. 3, no. 3 (July 2000); Zekom, Cosmetics and Toiletries Mag., vol. 112 (November 1997), page 37.

In all documents, reference is made to the necessity of using zinc ricinoleate as a liquid formulation. Use as a dry solid substance on sheet-like supports is not mentioned.

The main field of use of zinc ricinoleate is in cosmetics for personal hygiene, where it has a particularly large number of advantages owing to its ambivalent character, i.e. its ability to bind both nucleophilic (basic) and electrophilic (acidic) odour molecules. In contrast to cyclodextrin and active carbon, the binding is irreversible (chemisorption), but the kinetics of binding is comparatively slow.

Owing to the waxy consistency of zinc ricinoleate in combination with only low solubility in customary solvents, use on sheet-like structures of the paper or nonwoven type for the creation of absorber materials for the household or other daily needs appeared to be difficult and scarcely feasible.

However, the inventors have found that, under certain preconditions and with the use of the preferred techniques, described in more detail below, of application from dilute dispersions (suspensions) or of spraying on in the form of very fine melt droplets, zinc ricinoleate can be applied permanently to sheet-like structures of vegetable or man-made fibres without the performance characteristics of the sheet-like structure which are otherwise important for its end use, in particular its air permeability, pore structure and mechanical properties, such as strength and bursting pressure, being adversely affected. Even if sheet-like structures of the paper and/or nonwoven type are primarily discussed in the present Application, the use or concomitant use of textile materials having suitable properties, for example in the form of woven or knitted layers or reinforcing layers in composite materials, should not be expressly ruled out.

Furthermore, it was also found that zinc ricinoleate in a finely divided form obtainable by said methods, on an air-permeable support of the paper and/or nonwoven type, has outstanding odour absorption properties even in the solid state.

The odour absorption materials according to the invention or to be produced according to the invention are sheet-like structures, in particular of the paper or nonwoven type or combinations thereof. In principle, regarding the usability of certain sheet-like structures of this type, there are no limitations or selection rules other than those already familiar to the person skilled in the art for such sheet-like structures for a corresponding technical use. It is therefore possible to use all types of paper or nonwoven materials, or any desired combinations thereof, as already employed for comparable uses, but without treatment with zinc ricinoleate. In this context, for supplementing the present disclosure in this respect, reference may be made, for example, to the overview on the production of papers and wet-laid nonwovens in "Vliesstoffe, Teil II: Herstellungsverfahren für Vliesstoffe [Nonwovens, Part II: Production processes for nonwovens]", edited by W. Albrecht, H. Fuchs, W. Kittelmann, WILEY-VCH Verlag GmbH, Weinheim, 2000; to the disclosure in patent application EP 1 674 014 A1 or patent application EP 1 199 094 A1. The person skilled in the art also obtains further information and suggestions with regard to the basic sheet-like structures suitable for the respective intended uses from the following examples.

Sheet-like structures which are used for filter media for air filtration usually have a mass per unit area of 10 to 1000 g/m$^2$ (determined according to DIN EN ISO 536) and an air permeability of 25-10 000 l/m$^2$s (determined according to DIN EN ISO 9237 at 200 Pa). If they are used as vacuum cleaner bags, the corresponding mass per unit area is preferably in the range of 40-300 g/m$^2$ and the air permeability in the range of 25-2000 l/m$^2$s.

Sheet-like structures which are suitable for the purposes of the present invention may be, for example, those based on vegetable or manmade fibres or mixtures thereof, which were produced by a wet-laid process. They may also be fully manmade nonwovens which are produced as spunbonded fabrics, carded webs or melt blown. Furthermore, they may also have been produced, for example, by the air-laid method from pulp, manmade fibres or mixtures thereof. For consolidation, the sheet-like structures can be impregnated with a binder or may contain melt-bonded fibres/biocomponent fibres. Furthermore, they may have a layer structure, for example a layer structure which is composed of paper and/or wet-laid nonwoven and/or manmade nonwovens.

All sheet-like structures of this type can be treated according to the invention with zinc-ricinoleate, it being possible to use one of the techniques discussed below if the particular properties of zinc ricinoleate are appropriately taken into account.

Pure zinc ricinoleate is a waxy substance of little hardness at room temperature. It is therefore not possible for the raw material present in the form of coarse pellets (diameter about 5 mm) to be comminuted under ambient conditions with the aid of mechanical methods to a particle size suitable for the intended use (diameter <<0.5 mm). It is therefore necessary to choose another method which permits a fine distribution of the absorber substance zinc ricinoleate on the sheet-like structure support even when small amounts are applied.

In principle, those embodiments of customary methods for the application of binders or similar substances, which are primarily suitable for this purpose, such as impregnation, spraying, immersion, printing or foaming, etc., are to be considered. In these methods, after the action of the liquid treatment material, the sheet-like structure is finally dried by means of customary methods, for example cylinder drying, circulation drying, radiant drying, air-floatation dryer, etc, for eliminating the liquid used as a carrier, usually water. Such methods too are described in general form and by way of example in "Vliesstoffe, Teil II: Herstellungsverfahren für Vliesstoffe [Nonwovens, Part II: Production processes for nonwovens]", edited by W. Albrecht, H. Fuchs, W. Kittelmann, WILEY-VCH Verlag GmbH, Weinheim, 2000.

For producing small particles for application to a sheet-like structure, in particular one having high air permeability, it was expedient to try out various procedures known per se:

One of these is the so-called cold milling method in which the temperature is kept below the glass transition temperature of the material by cooling, which leads to embrittlement and hence to a sufficient mechanical hardness for the desired comminution process. However, the fact that the glass transition temperature is exceeded again after the milling process and the milled material softens must be mentioned as a disadvantage.

The particles obtained may re-agglomerate in subsequent process steps which develop greater compressive or shear forces. This can be avoided only if the milled material is subjected to further processing steps before it warms up to ambient conditions, either directly in a coating process or beforehand in a stabilizing procedure, for example suspending in a dispersive medium. Because of more advantageous methods, such a procedure is considered to be not very suitable and is currently not preferred for zinc ricinoleate.

A better route is the direct production of a dispersion of fine particles in a dispersing medium (as a rule water), permitting exact adjustment of concentration and a homogeneous distribution of the particles. In practice, a dispersion is produced by introducing the molten or dissolved substance into a dispersing medium present in large excess, in which the substance is precipitated owing to its low solubility and fine crystals or amorphous precipitates form. The particle size of the added substance is decisively influenced in this type of method by the concentration ratios, the addition time, the effectiveness of stirring, shear forces and the temperature of the dispersing medium. Ideally, the substance is added slowly with vigorous stirring to a large excess of a dispersing medium which is as cool as possible. The dispersion thus obtained is preferably immediately subjected to further process steps in order to prevent ageing effects, for example agglomeration and sedimentation of the dispersed particles.

A further advantageous method often particularly suitable for the purposes of the present invention is the direct production of small particles by atomization of the molten or dissolved odour-absorbing substance. In this procedure, the substance is nebulized, and fine droplets or filaments form. The substance atomized from the melt cools substantially through the supply of cool air in the air stream itself and is precipitated in the form of substantially discrete solidified or solidifying droplets on the substrate (sheet-like structure). The process for nebulising of solutions takes place analogously but vaporisation of the solvent additionally occurs. Since the substance is present in the solution in dilute form, it is frequently possible—depending on the concentration—to achieve an even smaller particle or filament diameter by atomization of a solution. After the deposition on the substrate, the applied substance can additionally be fixed on the substrate if required or desired by various methods, inter alia by calendering, covering with an additional layer or thermal fixing.

For the application of zinc ricinoleate, the stated techniques of application from a dispersion or as a melt mist are currently preferred. The following procedures are preferably adopted:

a. Dispersion Method:

Preparation of a Dispersion of Zinc Ricinoleate:

Zinc ricinoleate is dissolved in a suitable solvent, e.g. triethanolamine in a proportion of not more than 60% with heating. The solution obtained is allowed to run slowly, with vigorous stirring, into a dispersing medium (e.g. water) which is not suitable as a solvent for zinc ricinoleate, whereupon the solvent dissolves in the dispersing medium and the solubility falls below the solubility of zinc ricinoleate in the dispersing medium, which leads to flocculation.

Application of Zinc Ricinoleate as a Dispersion:

The zinc ricinoleate is added in very finely dispersed form during the preparation of the binder mixture for a sheet-like structure of the paper type, as described in more detail by way of example in the following Example 1 according to the invention. The dispersion can also be produced in situ during the mixing of the components. The latter is effected by addition of a solution of zinc ricinoleate in a suitable solvent to the binder batch, which is substantially an aqueous phase. By mixing the solution of zinc ricinoleate with water, precipitation of the zinc ricinoleate from its solvent occurs. Sufficient mixing must be ensured here in order to avoid agglomeration. The suspension obtained is then fed, for example, to a size press, with which it is applied. In the subsequent drying, evaporation of the water and other volatile solvents occurs, and the binding components produce binding points between the fibres. In addition, melting of the dispersed particles of zinc ricinoleate without formation of a continuous film or pore closure and subsequently absorption of the melt onto the surfaces of the fibres occurs. This ensures the greatest possible surface area of the odour absorber without the air permeability of the filter medium being adversely affected.

In Example 2 according to the invention below, the support is passed through an immersion bath which contains a dispersion of zinc ricinoleate particles. After wetting with the dispersion, the impregnated web is subjected to a drying process—either, for example, using a radiant dryer or circulation dryer. On exceeding the melting point of the zinc ricinoleate on the surface, the melt of the odour absorber is adsorbed onto the surface of the fibre constituents of the support.

b. Application by Means of Spray Methods:

A melt of an odour absorber (zinc ricinoleate) is transported under pressure into an apparatus which permits atomization of the melt through nozzles of small diameter (<0.5 mm). Owing to the small bore diameter of the nozzles, nebulization and deposition of the melt on the sheet-like structure (paper, nonwoven, textile) in the form of precipitating fine discrete mist droplets occur at the simultaneously applied high pressure due to strong shear forces at the nozzle exit. At lower pressure (greater nozzle diameter or slower transport), filaments which are laid linearly on the surface of the substrate and solidify during this procedure or thereafter are obtained instead of droplets.

The amount applied can be regulated in both variants by the throughput of the melt and the running speed of the substrate. An application of 0.1 to 5% of the mass per unit area of the substrate is practicable in this technique.

In the techniques described above, sheet-like structures which have only the odour absorber zinc ricinoleate as an impregnation or point-like droplets on the fibres of the sheet-like structure are obtained, the coating preferably or exclusively being obtained on only one side of the sheet-like structure in the case of application in the form of a mist from the melt.

However, it is within the scope of the present invention to use zinc ricinoleate or the sheet-like structures impregnated therewith in combination with other odour-binding substances, which is supported, for example, by the following considerations:

Zinc ricinoleate is an odour absorber having high absorptivity for both nucleophilic (basic) and electrophilic (acidic) substances, e.g. odorants. It is therefore suitable per se for use as a broadband odour absorber.

On the other hand, however, zinc ricinoleate is a substance which tends to be expensive for the desired uses and products, for which there are certain economic limits in the price structure, and which moreover has a better effect on longer contact with the atmosphere to be deodorized than in the case of short contact time.

Taking into account these circumstances, it may be advantageous to use zinc ricinoleate in an odour absorber not as the sole substance for odour binding. For example, it may be advantageous to combine zinc ricinoleate in one and the same sheet-like structure, or by combination with a second sheet-like structure, with a second, more economical odour adsorber which removes the odorants to be removed preferably by another action mechanism. Such a procedure is pertinent, for example, if certain substances which can essentially also easily be removed by other means occur in the odour-laden gas space in a quantitatively high proportion, for example certain acidic or basic or lipophilic substances which readily bind also to particulate adsorbers, such as, for example, active carbon or zeolites, or to cyclodextrins. If it is ensured that such substances must not be bound by the zinc ricinoleate, for example by permitting binding to another such odour adsorber upstream, the absorptivity thereof and hence the duration of use can be maintained over longer periods than in the case of its use alone.

For this purpose, for example, it is possible to adopt a procedure in which zinc ricinoleate is arranged as a separate sheet-like structure or as a surface layer, for example as a layer applied by melt application, on that side of a sheet-like structure serving as an odour absorber which faces away from the odour source, which sheet-like structure contains in its substance or as a further layer another, for example particulate, odour adsorber. The atmosphere coming into contact with the zinc ricinoleate is then already pre-purified, and the amount of odorant to be bound is smaller. In such a procedure, selective adsorption properties which constitute a disadvantage on sole use of a selective odour adsorber, such as, for example, a certain zeolite, can also be routinely used and may be advantageous, particularly if certain odorant combinations known in their molecular composition are involved.

Furthermore, the combination of an adsorber having high but reversible adsorption kinetics with zinc ricinoleate may also be advantageous from the points of view of improving the overall binding kinetics of the combination material and the completeness of the odour absorption or the elimination of disadvantageous consequences of desorption. Thus, for example, an active carbon constituent or zeolite constituent can adsorb an odour or an odorant more rapidly than zinc ricinoleate. If the adsorbed odorant is then gradually desorbed again, for example by establishing an equilibrium with the surrounding atmosphere, and if zinc ricinoleate is available in the vicinity for irreversible binding, this may lead altogether to an improvement in the adsorption behaviour.

A possibility for the combination of different odour adsorbers/odour absorbers consists, for example, in also adding a zeolite constituent to the impregnation liquor already discussed (which contains finely dispersed zinc ricinoleate) in order to increase the odour adsorption capacity of the material produced or to obtain a more economical treatment. Furthermore, a layer of solidified fine zinc ricinoleate droplets which acts as a secondary, irreversible absorber layer for fine purification or subsequent purification can be applied, for example, to a sheet-like structure having an impregnated zeolite adsorber, for example a material according to EP 1 674 014 A1. It is also possible to arrange a sheet-like structure having an odour absorber according to the present invention downstream behind a separate air-permeable odour absorber laden with zeolite, for example according to EP 1 674 014 A1, in order to achieve the abovementioned synergistic effects.

Further possible combinations which are evident to the person skilled in the art from the above statements are likewise expressly within the scope of the present invention.

The invention is illustrated in more detail below with reference to some specific working examples.

DETAILED DESCRIPTION OF PREFERRED EMBODIMENTS

The following examples are to be understood as illustrative of the invention and not as limiting in any way.

EXAMPLES

Preliminary remark: Unless evident otherwise from the context in the text, all data in % in the present description and the examples are data in % by mass.

The technical characteristics stated in the description and in the examples were determined by relevant standardized methods of determination which are stated in the following expressions in brackets: Mass per unit area (DIN EN ISO 536); thickness (DIN EN 20534; feeler pressure 10 N); air permeability (DIN EN ISO 9237 at 200 Pa); bursting pressure (based on DIN EN ISO 2758, test area 10 cm$^2$); breaking force (DIN EN ISO 1924-2).

Example 1

Production of an Odour-adsorbing, Highly Air-permeable Paper for Use in Vacuum Cleaner Filter Bags A filter paper produced by the wet-laying method and having a fibre composition of 75% by weight of southern bleached pulp long fibre, 10% by weight of bleached eucalyptus fibres and 15% by weight of polyester fibres 1.7 dtex/12 mm was impregnated with the size liquor described by way of example below.

For the preparation of the size liquor, water was initially introduced at a temperature <25° C. into a mixing tank, and a 50% solution of zinc ricinoleate in triethanolamine, thermostatted at 80° C., is added slowly with vigorous stirring. The finely disperse precipitation of the adsorber in the aqueous phase occurs. After complete addition, the further components of the binder mixture are added: Starch dissolved in water, latex (polyvinyl acetate), wetting agent, colour, biostat active substance. The base paper is then impregnated with this liquor in a size press and then dried using a circulation dryer at an air temperature of 200° C.

An exemplary formulation of said size liquor is as follows:
89.31% of water
1.37% of zinc ricinoleate
1.23% of triethanolamine
5.74% of oxidatively degraded potato starch
2.06% of polyvinyl acetate
0.29% of biostat The impregnated filter paper was composed of 90% by weight of fibres and 10% by weight of binder. The content of zinc ricinoleate in the finished product was about 1.28% by weight.

The following product features were measured for this filter paper (internal designation: E 50 M biostat ZnR):
Mass per unit area: 53.8 g/m$^2$
Air permeability: 200 l/m$^2$s
Bursting pressure: 131 kPa
Breaking force, longitudinal: 44.5 N
Breaking force, transverse: 20.9 N.

The paper treated with the zinc ricinoleate showed practically the same product features as the corresponding paper without zinc ricinoleate (designation: reference paper E 50 M biostat).

Example 2

Production of an Odour-adsorbing Layer Consisting of Manmade Fibres for Use in a Multilayer Vacuum Cleaner Filter Bag Generally speaking, a fibrous sheet-like structure, wet or dry laid, consisting of manmade fibres (polyolefins, polyester) and having a weight per unit area of 10 to 80 g/m$^2$ and a thickness of 0.1 to 5 mm is wetted in an immersion bath with a dispersion of zinc ricinoleate in a solvent and then dried in a circulation dryer at least 150° C. The drying results in the evaporation of the solvent and dispersing medium with simultaneous melting and adsorption of the dispersed zinc ricinoleate onto the fibres of the support material.

In a specific exemplary embodiment the composition of the impregnating dispersion was as follows:
95% of water
2.5% of zinc ricinoleate
2.5% of ethoxylated fatty acid ester C12-C15

Starting from a wet-laid nonwoven comprising 20% by weight of chemical pulp, 60% by weight of polyester fibres and 20% by weight of bicomponent fibres (polyethylene terephthalate core, polyethylene mantle) having a mass per unit area of 60 g/m$^2$, a thickness of 0.42 nm and an air permeability of 3450 l/m$^2$s, a sheet-like structure according to the invention which was impregnated with a zinc ricinoleate odour absorber was produced by impregnation with the abovementioned impregnating liquor and subsequent drying.

The content of additives after impregnation, determined by the weight increase, was 2.85% by weight, which corresponds to a zinc ricinoleate content of about 1.43% by weight. The impregnated product had practically the same air permeability as the starting material.

Example 3

Production of an Odour-adsorbing Spunbonded Nonwoven Layer for Use in a Multilayer Filter Medium for Vacuum Cleaner Bags Zinc ricinoleate was applied as a melt mist to a polypropylene spunbonded nonwoven having a mass per unit area of 25 g/m$^2$, a thickness of 0.22 mm and an air permeability of 2730 l/m$^2$s by means of a hotmelt spray unit of type UDF from ITW Dynatec. The spray unit produces very fine droplets which, before striking the substrate, are cooled to such an extent that they adhere to the surface of the spunbonded nonwoven.

The amount applied is controlled by the transport power of the melt pump and the speed with which the support material is transported past below the application beam. The amount of zinc ricinoleate applied was about 2.5 g/m$^2$. The air permeability and the thickness of the starting spunbonded nonwoven were virtually unchanged as a result of the application of the absorber.

This spunbonded nonwoven treated with zinc ricinoleate was then laminated with a meltblown layer of 25 g/m$^2$ and two polypropylene spunbonded nonwoven layers of 14 g/m$^2$ to give the four-layer filter medium and received the internal designation MBK 671-D14L ZnR. The layers were joined by an ultrasound technique using a rhombus-shaped point design. The diameter of the fixing points was 1.5 mm and the press area was 1.2% (proportion of area of binding points, based on the total area).

Compared with a laminate of an otherwise identical structure but with the use of a 25 g/m$^2$ spunbonded nonwoven without zinc ricinoleate (MBK 671-D14L), no changes in the lamination properties and the bonding strength of the layers were found.

The following product features were determined for the product MBK 671-D14L ZnR according to the invention:
Mass per unit area: 80.5 g/m$^2$
Thickness: 0.515 mm
Air permeability: 355 l/m$^2$s.

Thickness and air permeabilities practically correspond to those of the reference type MBK 671-D14L (without zinc ricinoleate). The mass per unit area was higher than in the case of the reference type, owing to the absorber coat of 2.5 g/m$^2$.

Example 4

Production of an Odour Adsorbing, Paper Consisting Predominantly of Vegetable Fibres for Use in the Form of Bags in Waste Containers A melt of zinc ricinoleate is applied as in Example 3 by means of a hotmelt spray unit of type UFD from ITW Dynatec to a substrate. The distance is chosen so that cooling and solidification of the droplets or filaments takes place between emergence of the melt from the spray nozzles and deposition on the substrate transported underneath. This process is supported by blowing cooled air into this spray curtain. After deposition on the substrate, the treated layer is covered with a further layer of a sheet-like laid web and protected and consolidated either by ultrasonic welding (in the case of fully synthetic or semisynthetic laid webs) or by thermal calendering.

Processing temperature: 150° C., mass per unit area about 2 g/m$^2$.

Example 5

Production of an Odour Adsorbing Filter Material Consisting of Manmade Fibres for Use in Extractor Hoods Zinc ricinoleate in molten form is sprayed by means of a hotmelt spray unit of type UFD from ITW Dynatec onto a carded nonwoven used in extractor hoods and comprising about 350 g/m$^2$ of stabilized polyester fibres.

Processing temperature: 150° C.; coat weight about 10 g/m².

All examples given show, on comparison of the product features of identical products with and without zinc ricinoleate, practically the same technical values for the product features of air permeability, thickness, breaking force and pore diameter, and corresponding processability. The maintenance of the values for the air permeability and the mechanical properties is of decisive importance particularly for use as odour-absorbing filter media.

Example 6

Testing of the Odour-absorbing Properties of Sheet-like Structures According to Examples 1 and 3

The odour-absorption properties of a treated paper according to the invention, based on Example 1 (E 50 M biostat ZnR), was determined in comparison with an identical product without zinc ricinoleate (E 50 M biostat) by olfactometric determination according to DIN EN 13725.

The same was carried out with the materials MBK 671-D14L ZnR and MBK 671-D14L according to Example 3.

The olfactometry according to DIN EN 13725 is based on the presentation of odours which a test panel of, as a rule, four persons has to rate.

In the measurement, one and the same sample in different concentrations is supplied to the panel. The dilution is effected with neutral air without an odour, e.g. compressed air or—under corresponding laboratory conditions—ambient air. In several measurement series, the dilution factor at which 50% of the panel could perceive an odour, the so-called "odour threshold", is determined from the testers' reports.

For this dilution factor, the European odour unit per cubic meter (1 ODU/m³) is defined as the basic unit of the odour concentration. The odour concentration of the sample investigated is then a multiple of an ODU/m³, corresponding to the dilution set for the odour threshold determination. The odour concentration in ODU/m³ can just as easily be used as the mass concentration in kg/m³.

In the olfactometric determination, the respective test person of the test panel has to rate the gas emerging from a smelling tube as to whether it smells of something or not. The test person is aware that so-called zero samples will also be offered at random positions in the series presented. Zero samples are samples which consist only of neutral air. In this mode, a smelling tube with neutral air can also be made available to the test person as a permanent possibility for comparison, but this is not absolutely essential.

For the presentation procedure, it is true that each sample may be offered for not more than 15 s. Likewise, the pause between two presentations must be at least 30 s. The two time specifications have the purpose of preventing the test person from becoming familiar with an odour (adaptation).

Determination of the odour-reducing properties of media with an odour-adsorbing effect:

Samples of material containing odour adsorbers and identical comparative material without odour adsorbers are brought into contact with the odorant (e.g. acetic acid, n-butanol) in a PET tube (Nalophan) sealed air-tight and are conditioned for one hour. The determination of the reduction of the odorant concentration in the closed gas space is then effected in an olfactometer (Ecoma T06) with in each case three individual measurements per material sample by a group of four test persons. By comparison between zero sample, reference and development sample, the odour-reducing effect of zinc ricinoleate can be quantitatively determined.

In the olfactometric testing of the materials according to the invention in comparison with reference materials, the following results were obtained:

TABLE 1

Paper support according to production Example 1

| | Test odorant | |
|---|---|---|
| | Acetic acid 98% [ODU/m³] | n-butanol [ODU/m³] |
| Zero sample | 12000 | 13000 |
| Reference paper E50 M biostat | 800 | 13000 |
| Test paper E50 M biostat ZnR | 300 | 7300 |

TABLE 2

Fully synthetic support according to Example 3

| | Test odorant | |
|---|---|---|
| | Acetic acid 98% [ODU/m³] | n-butanol [ODU/m³] |
| Zero sample | 12300 | 15500 |
| Reference synthesis MBK671-D14L | 10321 | 6100 |
| Test synthesis MBK671-D14L ZnR | 348 | 3100 |

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A vacuum cleaner bag comprising:
an odor-absorbing filter medium for air filtration in the vacuum cleaner bag in the form of a sheet having a mass per unit area in a range of 40 to 300 g/m² and an air permeability in a range of 25 to 2000 l/m², and
at least one of vegetable and manmade fibers, and zinc ricinoleate in an amount in a range of 0.1 to 20% by weight, based on the weight of the filter medium, in finely divided solid form on at least a part of the fiber surface.

2. The vacuum cleaner bag according to claim 1, wherein the filter medium comprises at least one of paper and a nonwoven or a textile structure in the form of a sheet.

3. The vacuum cleaner bag according to claim 1, wherein the zinc ricinoleate is at least on one side of the filter medium in the form of discrete solidified droplets.

4. The vacuum cleaner bag according to claim 1, wherein the solid zinc ricinoleate is adsorbed onto the fibers.

5. The vacuum cleaner bag according to claim 1, further comprising at least one additional material having odour-adsorbing properties, wherein said odor absorbing material is applied as an air-permeable impregnation or coating on at least one side of the filter medium.

6. The vacuum cleaner bag according to claim 5, wherein the filter medium contains at least one additional material having odour-adsorbing properties which is selected from the group consisting of active carbon, zeolites and cyclodextrins.

7. The vacuum cleaner bag according to claim 6, wherein the material is part of a layer composite with other structures in the form of sheets.

\* \* \* \* \*